(12) United States Patent
Kaupert et al.

(10) Patent No.: US 8,715,877 B2
(45) Date of Patent: May 6, 2014

(54) BURNER AND FUEL CELL SYSTEM EQUIPPED THEREWITH

(75) Inventors: Andreas Kaupert, Esslingen (DE); Guenter Eberspach, Wolfschlugen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 1792 days.

(21) Appl. No.: 11/805,551

(22) Filed: May 23, 2007

(65) Prior Publication Data
US 2008/0292929 A1 Nov. 27, 2008

(30) Foreign Application Priority Data

May 23, 2006 (DE) .................. 10 2006 024 574

(51) Int. Cl.
*H01M 8/04* (2006.01)
*H01M 8/00* (2006.01)
*F28D 7/00* (2006.01)

(52) U.S. Cl.
USPC ........... 429/433; 429/434; 429/441; 429/442; 165/164

(58) Field of Classification Search
None
See application file for complete search history.

(56) References Cited

U.S. PATENT DOCUMENTS

| 2002/0090587 A1 | 7/2002 | Pribish |
| 2003/0098146 A1* | 5/2003 | Angermann et al. ......... 165/167 |
| 2004/0154584 A1 | 8/2004 | Hayakawa et al. |
| 2006/0008756 A1* | 1/2006 | Kaupert et al. ............... 431/354 |

FOREIGN PATENT DOCUMENTS

| DE | 10 2004 033 545 | | 2/2006 | |
| DE | 102004033545 A1 | | 2/2006 | |
| EP | 1231658 A3 | | 8/2002 | |
| EP | 1571726 A1 | | 9/2005 | |
| EP | 1619737 | * | 1/2006 | ............. H01M 8/04 |
| EP | 1619737 A1 | | 1/2006 | |

* cited by examiner

*Primary Examiner* — Barbara Gilliam
*Assistant Examiner* — Angela Martin
(74) *Attorney, Agent, or Firm* — Howard IP Law Group, PC

(57) ABSTRACT

The invention relates to a burner, in particular a residual gas burner for a fuel cell system. The burner includes a combustion chamber which is bordered by a supply wall and by a heat exchanger and which is encompassed at the sides by a burner wall. The heat exchanger is a cross-current heat exchanger having a primary path and a secondary path. The supply wall has a burner zone with oxidizer openings for oxidizer gas and with combustion gas openings for combustion gas and a bypass zone with bypass openings for bypass gas. The bypass zone is arranged in a section of the supply wall which is allocated to an area of the heat exchanger adjacent to the primary path and to the secondary path at the inlet end, so that the bypass gas or a bypass gas-burner exhaust gas mixture acts upon this area.

19 Claims, 3 Drawing Sheets

BURNER AND FUEL CELL SYSTEM EQUIPPED THEREWITH

FIELD OF THE INVENTION

The present invention relates to a burner, in particular a residual gas burner for a fuel cell system. The invention also relates to a fuel cell system equipped with such a burner.

BACKGROUND OF THE INVENTION

DE 10 2004 033 545 A1 discloses a burner using a fuel cell which is used in a fuel cell system for combustion of residual gases, i.e., anode exhaust gas and cathode exhaust gas. The burner comprises a combustion chamber bordered at the inlet end by a supply wall and at the output end by a heat exchanger. The combustion chamber is also encompassed laterally by a burner wall. The supply wall has a burner zone with oxidizer gas openings to supply the combustion chamber with oxidizer gas and with combustion gas openings to supply the combustion chamber with combustion gas. With the known burner, an inside wall encompassing the combustion chamber laterally is arranged inside the burner wall and at a distance therefrom to provide thermal insulation for the combustion chamber. This creates an annular cooling space, which is supplied with gaseous coolant, between the inside wall and the burner wall on the outside. The gaseous coolant is supplied through openings in the supply wall. Oxidizer gas supplied to the oxidizer gas openings of the burner zone is preferably used as the gaseous coolant.

SUMMARY OF THE INVENTION

The present invention relates to the problem of providing an improved embodiment for a burner and/or a fuel cell system equipped therewith such that it is characterized in particular by a reduced thermal load on the heat exchanger.

The invention proposes the use of a cross-current heat exchanger for bordering the combustion chamber, in which a primary path may be provided through which burner exhaust gas may flow as the primary medium in a primary direction and in which a secondary path of a secondary medium is coupled to the primary path in such a way so as to provide heat transfer in a secondary direction oriented across the primary direction. With the help of the cross-current design, the heat exchanger may be designed as a high-temperature heat exchanger. In this way, the heat exchanger is especially suitable for bordering the combustion chamber in the primary direction, i.e., in the direction of flow of the burner exhaust gases. Such a cross-current heat exchanger may be exposed to extremely high thermal loads during operation of the burner, because the hot, uncooled primary medium enters at the inlet end of the primary path, whereas the comparatively cold secondary medium, which is therefore used for cooling, enters at the inlet end of the secondary path. In this area of the cross-current heat exchanger which is adjacent to the inlet end of the primary path as well as to the inlet end of the secondary path, the maximum temperature difference thus occurs within the heat exchanger. This is thus associated with an extreme thermal load on the heat exchanger in this area. To reduce this thermal burden on the heat exchanger, the present invention proposes providing a bypass zone having bypass openings in the supply wall, such that these bypass openings serve to supply bypass gas to the combustion chamber. This bypass zone is arranged inside the supply wall according to the present invention, such that the critical area of the heat exchanger, which was described previously and is subject to such high thermal loads, is acted upon by comparatively cold bypass gas, i.e., cooled burner exhaust gas. In this way, the thermal burden on the heat exchanger is reduced. This invention is based on the general idea that to reduce the thermal load on the heat exchanger, it is sufficient to lower the gas temperature in the area of the heat exchanger adjacent to the inlet end of the primary path on the one end and to the inlet end of the secondary path on the other end. The present invention deviates from the usual design in this regard, in that for the primary path as well as the secondary path, the goal is most homogeneous possible temperature distribution in the flow cross section of the primary medium and/or the secondary medium at the inlet end in order to achieve the highest possible efficiency in heat transfer between the primary medium and the secondary medium. In contrast with that, the inventive design is based on the temperature gradient and reduces the thermal burden on the heat exchanger. The resulting unavoidable loss of efficiency in heat transfer is acceptable and is more than balanced by the prolonged lifetime of the heat exchanger achieved with the help of this measure.

In an exemplary embodiment, the bypass zone may be arranged exclusively in the area of the supply wall allocated to the inlet ends of the primary and secondary paths. This embodiment is based on the consideration that for the desired reduction in thermal burden on the heat exchanger, it is sufficient for bypass gas and/or cooled burner exhaust to act on the heat exchanger only in the area where the greatest temperature gradient occurs. The implementation of the respective bypass zone therefore becomes comparatively inexpensive.

It is self-evident that the features mentioned above and those yet to be explained below may be used not only in the particular combination given but also in other combinations or alone without going beyond the scope of the present invention.

Exemplary embodiments of the invention are depicted in the drawings and explained in greater detail in the following description, where the same reference numerals are used to refer to the same or similar or functionally identical components.

BRIEF DESCRIPTION OF THE DRAWINGS

In schematic diagrams.

DETAILED DESCRIPTION OF THE INVENTION

Figure 1:
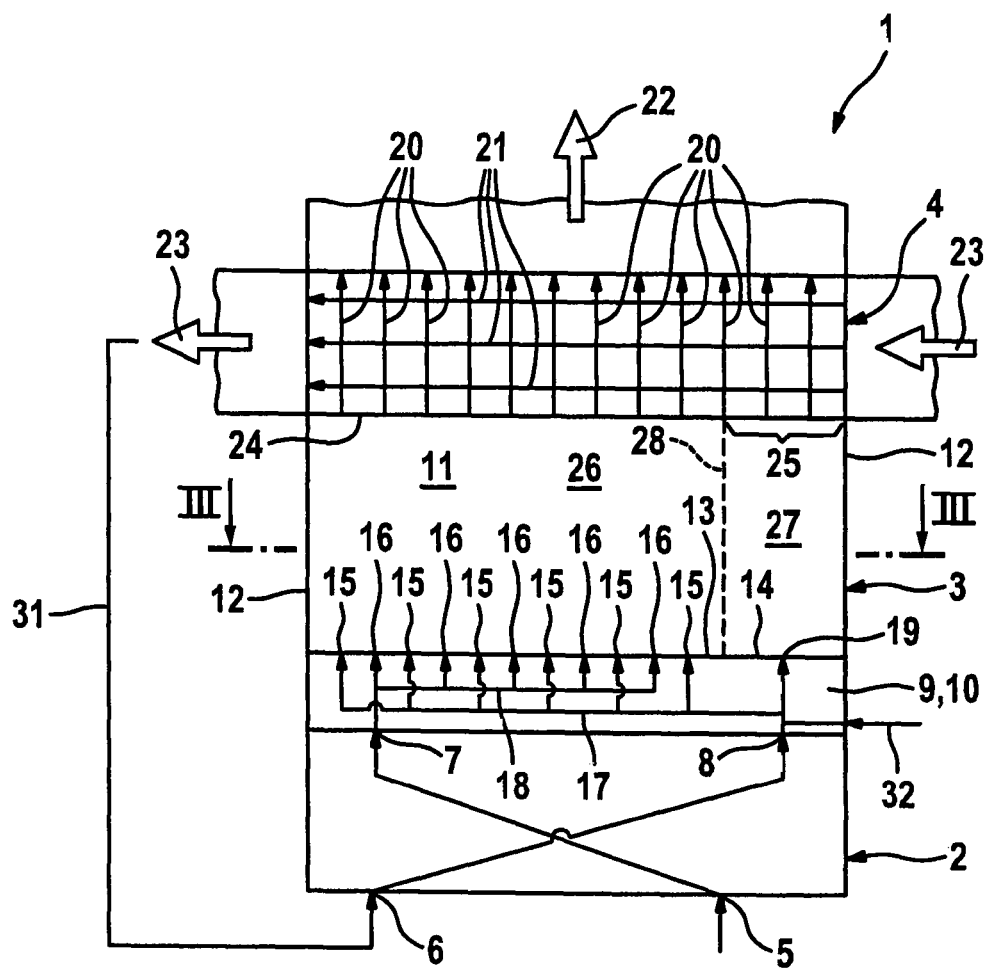
FIGS. 1 and 2 show a greatly simplified basic diagram like a wiring diagram of a fuel cell system in various embodiments, FIGS. 3 and 4 each show a cross section through a burner in various embodiments according to the sectional lines III in FIG. 1 and/or IV in FIG. 2.
Figure 2:
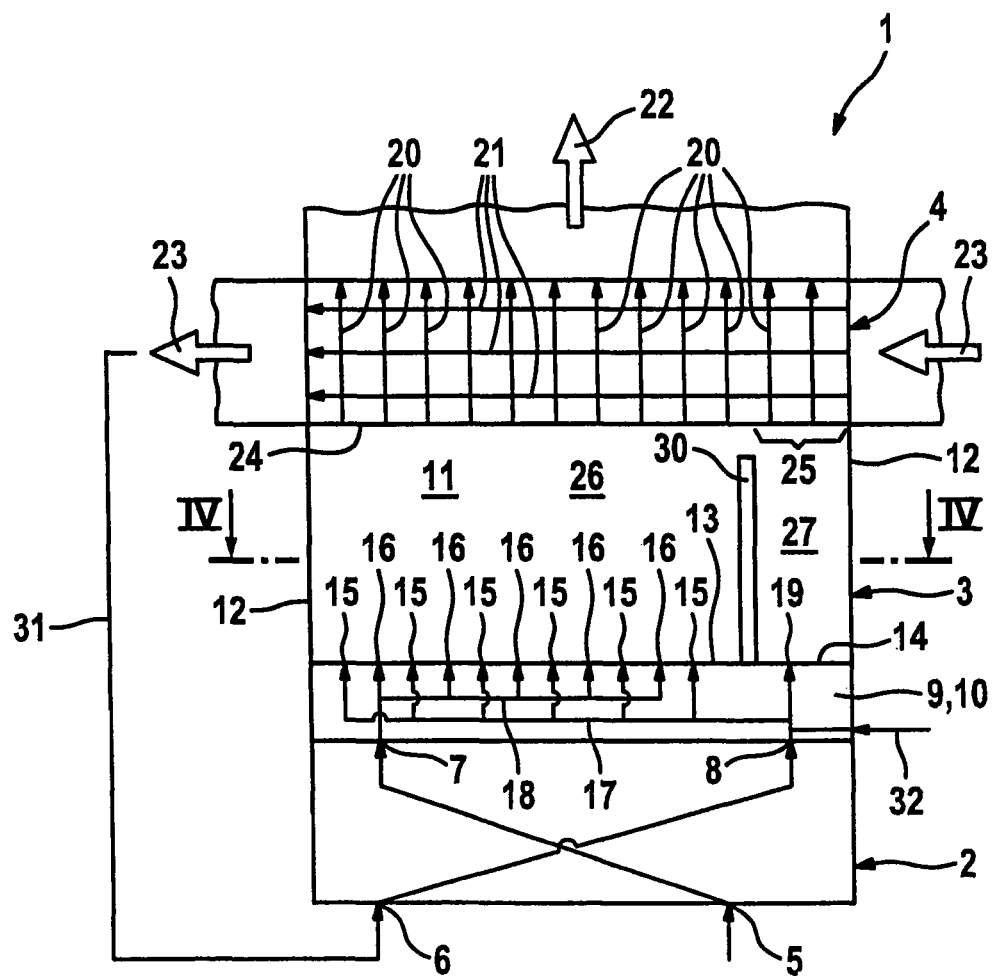

According to FIGS. 1 and 2, a fuel cell system 1, which is shown only partially here, includes a fuel cell 2, a burner 3 and a heat exchanger 4. The fuel cell 2 serves in the usual way to produce electricity from an oxidizer gas, in particular air or pure oxygen and from a combustion gas, preferably containing hydrogen.

The fuel cell system 1 may be arranged in a motor vehicle. For example, the fuel cell system 1 may serve as an additional electric power supply system in the vehicle, which operates independently of the engine in particular. Likewise, it is fundamentally possible to replace the generator of the vehicle with the help of such a fuel cell system 1.

For generating combustion gas, the fuel cell system 1 may also be equipped with a reformer (not shown here) which produces the combustion gas, e.g., by partial oxidation from a hydrocarbon fuel and from an oxygen-containing oxidizer. The combustion gas is supplied to the fuel cell 2 via an anode input 5. The fuel cell 2 also receives the oxidizer gas via a cathode inlet 6. Then the electrochemical generation of electricity takes place in the usual way in the fuel cell 2, converting carbon monoxide and hydrogen into water and carbon monoxide on the anode side with the help of oxygen from the cathode side. The fuel cell 2 is preferably a solid oxide fuel cell (SOFC), which may be designed as a high-temperature fuel cell in particular.

Anode exhaust gas emerges from an anode outlet 7 of the fuel cell. Since the conversion of the combustion gas in the fuel cell process is usually incomplete, the anode exhaust gas also still contains reactive hydrogen. The anode gas is thus a combustion gas. Cathode exhaust gas emerges from a cathode outlet 8 of the fuel cell on the cathode side. Because of the incomplete conversion process, the cathode exhaust still contains unconverted oxygen, so the cathode exhaust is still an oxidizer gas.

A fuel cell 2 usually consists of a stack of ceramic plates which form the anode side of the fuel cell 2 on the one hand, while on the other hand also forming the cathode side. This stack of plates is sealed with end plate 9 on at least one end of the fuel cell 2, with the anode outlet 7 and the cathode outlet 8 situated there as well. Likewise, it is fundamentally possible to integrate the anode inlet 5 and the cathode inlet 6 into this end plate 9, although that is not shown here for the sake of simplicity. With the configuration of the fuel cell system 1 and/or the burner 3 shown here, the end plate 9 of the fuel cell 2 forms a supply wall 10 of the burner 3. In other words, the supply wall 10 forms the end plate 9 of the fuel cell 2. This yields a simplified line guidance for the combustion gas (anode gas) that is supplied to the burner 3 and the oxidizer gas (cathode gas) that is supplied to the burner 3. At the same time, an extremely compact design of the fuel cell system 1 is achieved.

The burner 3 has a combustion chamber 11 which is bordered at the inlet end by the supply wall 10. At the outlet end, the combustion chamber 11 is bordered by the heat exchanger 4. To this extent, the heat exchanger 4 may also be interpreted as a component of the burner 3. The combustion chamber 11 is enclosed at the sides by a peripheral burner wall 12. The supply wall 10 has a burner zone 13 and has a bypass zone 14 on its side facing the combustion chamber 11. Several oxidizer gas openings 15 and several combustion gas openings 16 are formed in the supply wall 10 in the burner zone 13. The oxidizer gas openings 15 serve to supply oxidizer gas to the combustion chamber 11. Accordingly, the oxidizer gas openings 15 are connected to the cathode outlet 8 via an oxidizer gas line system 17 integrated into the supply wall 10. The combustion gas openings 16 serve to supply combustion gas to the combustion chamber 11. Accordingly, the combustion gas openings 16 are connected to the anode outlet 7 via a corresponding combustion gas line system 18 designed in the supply wall 10.

The supply wall 10 is provided with a plurality of bypass openings 19 in the bypass zone 14, so that a bypass gas can flow through these openings into the combustion chamber 11. In general, the bypass gas is a gas that bypasses the combustion process laterally in the combustion chamber 11. The bypass gas is relatively cool in comparison with the burner exhaust gas. Essentially any inert gas is a suitable bypass gas. However, an oxidizer gas may also be used as a bypass gas. An exemplary embodiment uses the oxidizer gas that is available anyway, namely the cathode exhaust gas, as the bypass gas. Accordingly, the bypass openings 19 are formed by oxidizer gas openings 15 and are connected to the oxidizer gas line system 17. Essentially, however, an external cooling gas supply is also conceivable, e.g., via a cooling gas line 32.

The heat exchanger 4 is designed as a cross-current heat exchanger. Accordingly, the heat exchanger 4 has a primary path 20, which is indicated here by vertical arrows, and a secondary path 21, which is indicated here by horizontal arrows. The two paths 20, 21 are linked together to allow heat exchange. In the primary path 20, a primary medium is passed through the heat exchanger 4 in a primary direction 22 indicated by an arrow. In the secondary path 21, a secondary medium is passed through a secondary direction 23 indicated by arrows. The heat transfer coupling between the paths 20 and 21 leads to a transfer of heat between the media. It is characteristic of the cross-current heat exchanger 4 that the primary direction 22 runs essentially perpendicular to the secondary direction 23.

Since the heat exchanger 4 borders the combustion chamber 11 at the output end, the primary medium is formed by the burner exhaust. At the same time, with the selected arrangement, an inlet end 24 of the primary path 20 runs across, i.e., perpendicular to the primary direction 22. Likewise, the supply wall 10 here extends essentially across the primary direction 22. Furthermore, the supply wall 10 here is designed to be planar, so that the supply wall 10 runs parallel to the inlet end 24 of the heat exchanger 4. The openings 15, 16 and 19 are preferably arranged in the supply wall 10, so that during operation of the burner 3, the respective gas can flow into the combustion chamber 11 in the primary direction 22. The supply wall 10 and the heat exchanger 4 are arranged a distance apart in the primary direction 22 and form the combustion chamber 11 between them. The heat exchanger 4 has an area 25, which is indicated by the curly brackets and is arranged at the inlet end with respect to the primary path 20 and also with respect to the secondary path 21. This area 25 receives the secondary medium before the heat transfer on the part of the secondary path 25 and receives the burner exhaust before the heat transfer on the part of the primary path 20. Subsequently the maximum temperature difference between the burner exhaust and the secondary medium prevails in this area 25.

According to an embodiment of this invention, the bypass zone 14 is arranged inside the supply wall 10 in a section allocated to said area 25 of the heat exchanger 4. Subsequently, during operation of the burner 3, bypass gas or a mixture of bypass gas and burner exhaust may act on the area 25 at the primary end. Consequently, the area 25 is exposed to a reduced temperature on the side of the primary path, so that the temperature gradient between the primary end and the secondary end is lowered in this area 25 of the heat exchanger 4. Thermal stresses associated with the temperature gradient can be reduced in this way.

The bypass zone 14 may be situated exclusively in the section of the supply wall 10 allocated to the area 25. In this way, the total quantity of bypass gas available is concentrated and sent to the area 25 to achieve a maximal reduction in the temperature gradient.

In the embodiment of the supply wall 10 with the burner zone 13 and the bypass zone 14, a reaction space 26 bordered by the burner zone 13 and a bypass space 27 bordered by the bypass zone 14 are formed in the combustion chamber 11. In the embodiments in FIGS. 1 and 3, the reaction space 26 develops openly into the bypass space 27. An imaginary boundary between the burner zone 13 and the bypass zone 14 and/or between the reaction space 26 and the bypass space 27 is represented by an interrupted line labeled as 28. With this open transition between the reaction space 26 and the bypass space 27, there is a certain mixing of burner exhaust and bypass gas during operation of the burner 3. At the same time, a portion of the bypass gas may participate in the combustion process in the reaction space 26 inasmuch as this is oxidizer gas. In this embodiment, at least one row of bypass openings consisting exclusively of bypass openings 19 is arranged inside the bypass zone 14. A row 33 of oxidizer openings consisting exclusively of oxidizer gas openings 15 is arranged in proximity to the row 29 of bypass openings. The borderline 28 runs between the row 33 of oxidizer openings and the row 29 of bypass openings, and the burner zone 13 and the bypass zone are adjacent to one another. Oxidizer gas emerging from these openings 15 of the row 33 of oxidizer openings participates in the combustion reaction in the reaction space 26 and/or can be mixed with bypass gas. The oxidizer gas flow from this row 33 of oxidizer openings leads to a shield of the oxidizer gas flow emerging from the other bypass hole row 29, so that the flow passes through the bypass space 27 comparatively unhindered and can act upon the area 25.

Figure 4:
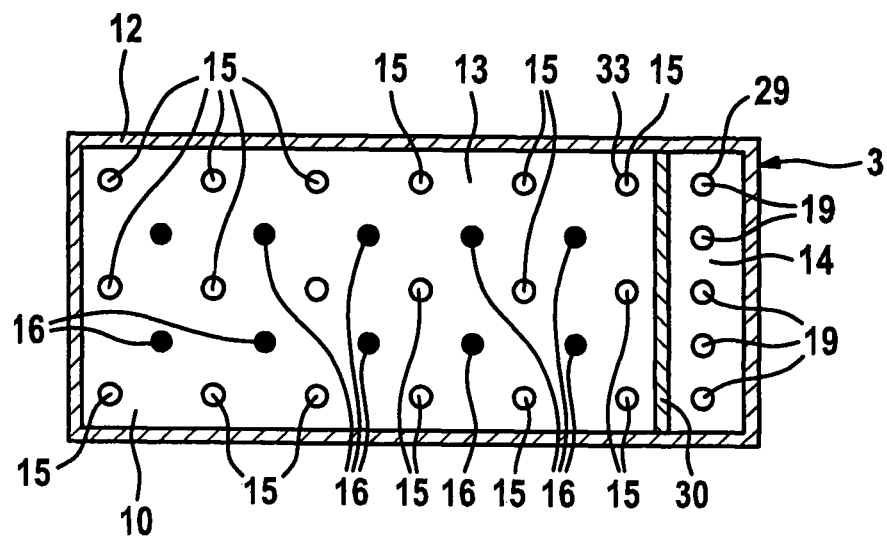

With the embodiment shown in FIGS. 2 and 4, a partition 30 is provided in the combustion chamber 11. This partition 30 separates the reaction space 26 from the bypass space 27. The partition 30 contacts the supply wall 10 while it may be a distance away from the inlet end 24 of the heat exchanger 4. The oxidizer gas flow emerging from the bypass openings 19 is largely separated by the partition 30 from the combustion process of the reaction chamber 11, so the bypass flow can act on the area 25 essentially unhindered.

Figure 3:
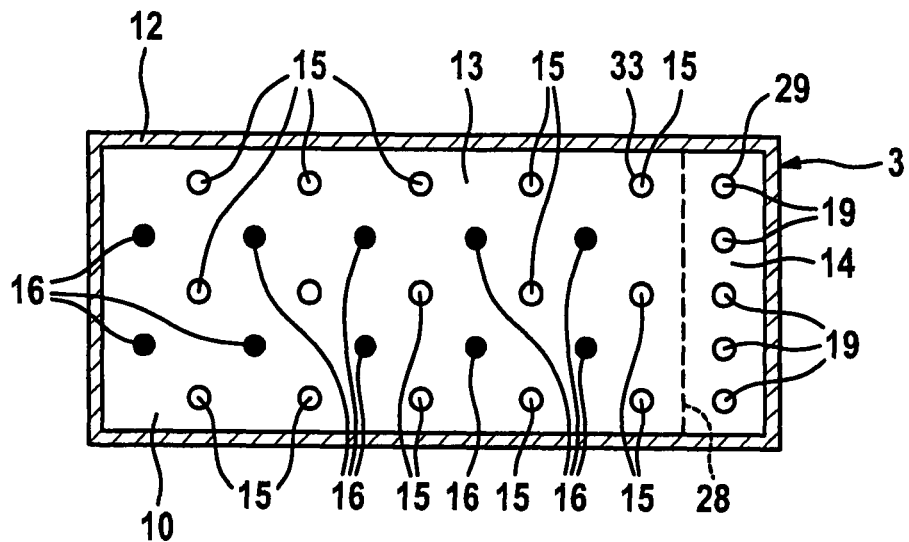

According to FIGS. 3 and 4, the oxidizer gas openings 15 and the combustion gas openings 16 may be arranged so they alternate regularly with one another inside the burner zone 13, whereby the combustion gas openings 16 may be enclosed by and/or adjacent to oxidizer gas openings 15 on all sides. Exclusively, bypass openings 19 are arranged in the bypass zone 14, i.e., in particular there are no combustion gas openings 16. It is clear here that the bypass openings 19 are oxidizer gas openings 15 as soon as oxidizer gas is used as bypass gas. In addition, the combustion gas openings 16 are arranged exclusively in the burner zone 13.

According to FIGS. 1 and 2, the heat exchanger 4 may be used to preheat the oxidizer gas supplied to the fuel cell 2. Accordingly, the secondary path 21 is connected at the outlet end to the cathode inlet 6 of the fuel cell 2 via an oxidizer line 31.

During starting operation of the fuel cell system 1, the fuel cell 2 must be raised to an operating temperature above which the fuel cell process can take place. During this warm-up phase, the combustion gas supplied to the anode flows through the fuel cell 2 and the oxidizer gas supplied to the cathode flows through the fuel cell 2, both of them more or less without reacting. At the same time, there is immediately an intense combustion reaction in the burner 3 with a great release of heat to the heat exchanger 4. During the heating phase, the cathode exhaust gas, i.e., the oxidizer gas, enters the bypass space 27 as bypass gas more or less at the ambient temperature in the area of the bypass zone 14 and leads to intense cooling of the inlet area 25. The ambient temperature may be 20° C., for example, while the combustion exhaust gases may already have a temperature between 900° and 1000° C. shortly after starting operation of the fuel cell system 1. Only with progressive heating of the fuel cell 2 is there a corresponding increase in temperature in the cathode exhaust. If an intense cooling of the inlet area 25 is also necessary for normal operation of the fuel cell system 1, then a suitable cooling gas, e.g., the oxidizer gas bypassing the heat exchanger 4, may additionally be supplied to the bypass openings 19 via the cooling gas line that is optionally provided.

The invention claimed is:

1. A fuel cell system comprising a residual gas burner, said gas burner comprising:
   a combustion chamber that is bordered at the inlet end by a supply wall and is bordered at the outlet end by a heat exchanger and is enclosed laterally by a burner wall,
   wherein the heat exchanger is a cross-current heat exchanger having a primary and a secondary path,
   wherein the burner exhaust can flow as the primary medium through the primary path of said heat exchanger in a primary direction, and a secondary medium can flow through the secondary path of said heat exchanger, said secondary path linked to the primary path to allow heat transfer, in a secondary direction oriented across the primary direction,
   wherein the supply wall has a burner zone with oxidizer gas openings for supplying oxidizer gas to the combustion chamber and with combustion gas openings for supplying combustion gas to the combustion chamber,
   wherein the supply wall has a bypass zone with bypass openings for supplying bypass gas to the combustion chamber,
   wherein the supply wall has a first end proximate an inlet end of the secondary path of the heat exchanger, and a second end opposite the first end,
   wherein the bypass zone is arranged exclusively in a section of the supply wall proximate the first end which is allocated to an area of the heat exchanger that is adjacent to the primary path as well as to the secondary path at the inlet end, so that the bypass gas or a bypass gas-burner exhaust gas mixture acts upon this area on the primary end during operation of the burner.

2. The burner according to claim 1, wherein the bypass zone and the burner zone are adjacent to one another between a row of bypass openings and a row of oxidizer gas openings.

3. The burner according to claim 1, wherein bypass openings are arranged exclusively in the bypass zone.

4. The burner according to claim 1, wherein the combustion gas openings are arranged exclusively in the burner zone.

5. The burner according to claim 1, wherein the combustion chamber has a reaction space bordered by the burner zone and a bypass space bordered by the bypass zone.

6. The burner according to claim 5, wherein the reaction space opens into the bypass space.

7. The burner according to claim 5, further comprising a partition arranged in the combustion chamber dividing the reaction space from the bypass space.

8. The burner according to claim 1, wherein said oxidizer gas openings and said combustion gas openings are arranged in the supply wall in such a way that the respective gas flows into the combustion chamber in the primary direction during operation of the burner.

9. The burner according to claim 1, wherein the supply wall is flat and extends across the primary direction.

10. The burner according to claim 1, wherein an inlet end of the primary path extends across the primary direction.

11. The burner according to claim 1, wherein the supply wall and the heat exchanger are arranged a distance apart from one another in the primary direction.

12. The burner according to claim 1, wherein the bypass openings are formed by oxidizer gas openings so that oxidizer gas enters the combustion chamber as bypass gas during operation of the burner.

13. The burner according claim 1, wherein
the supply wall is formed by an end plate of a fuel cell at the outlet end,
the oxidizer gas openings communicate with a cathode exhaust gas outlet of the fuel cell,
the combustion gas openings communicate with an anode exhaust gas outlet of the fuel cell.

14. A fuel cell system comprising:
a fuel cell for generating electric power from oxidizer gas and combustion gas; and
a burner comprising a combustion chamber that is bordered at the inlet end by a supply wall and is bordered at the outlet end by a heat exchanger and is enclosed laterally by a burner wall,
wherein the heat exchanger is a cross-current heat exchanger having a primary and a secondary path,
wherein the burner exhaust can flow as the primary medium through the primary path of said heat exchanger in a primary direction, and a secondary medium can flow through the secondary path of said heat exchanger, said secondary path linked to the primary path to allow heat transfer, in a secondary direction oriented across the primary direction,
wherein the supply wall has a burner zone with oxidizer gas openings for supplying oxidizer gas to the combustion chamber and with combustion gas openings for supplying combustion gas to the combustion chamber,
wherein the supply wall has a bypass zone with bypass openings for supplying bypass gas to the combustion chamber,
wherein the supply wall has a first end proximate an inlet end of the secondary path of the heat exchanger, and a second end opposite the first end,
wherein the bypass zone is arranged exclusively in a section of the supply wall proximate the first end which is allocated to an area of the heat exchanger that is adjacent to the primary path as well as to the secondary path at the inlet end, so that the bypass gas or a bypass gas-burner exhaust gas mixture acts upon this area on the primary end during operation of the burner, and
wherein a cathode exhaust gas outlet of the fuel cell is connected to the oxidizer gas openings of the burner zone and to the bypass openings of the bypass zone while an anode exhaust gas outlet of the fuel cell is connected to the combustion gas openings of the burner zone.

15. The fuel cell system according to claim 14, wherein the secondary path of the heat exchanger is connected at the outlet end to a cathode inlet of the fuel cell.

16. The fuel cell system according to claim 14, wherein the section of the supply wall comprising the bypass zone and bypass openings is isolated from the remainder of the supply wall via a partition, said partition extending between opposing portions of the burner wall.

17. The burner according to claim 1, wherein the section of the supply wall comprising the bypass zone and bypass openings is isolated from the remainder of the supply wall via a partition, said partition extending between opposing portions of the burner wall.

18. The burner according to claim 17, wherein the burner wall comprises a first end wall proximate the first end of the supply wall, a second end wall proximate the second end of the supply wall, and first and second opposing lateral walls extending between the first and second end walls for enclosing the combustion chamber,
wherein the partition comprises a first end abutting the first lateral wall, and a second end abutting the second lateral wall.

19. The burner according to claim 17, wherein the burner wall encloses each of the oxidizer gas openings, combustion gas openings, and bypass openings of the supply wall.

* * * * *